July 31, 1934.  O. A. CAVINS  1,968,282

SUCTION FISHING TOOL

Filed June 4, 1932

Inventor
Omar A. Cavins
By Lyon & Lyon
Attorneys

Patented July 31, 1934

1,968,282

UNITED STATES PATENT OFFICE 1,968,282

SUCTION FISHING TOOL

Omar A. Cavins, Taft, Calif.

Application June 4, 1932, Serial No. 615,409

14 Claims. (Cl. 294—86)

This invention relates to a fishing tool, and the invention is particularly useful in the construction of fishing tools to be operated in a well having considerable hydrostatic pressure or liquid head at the point where the tool performs the fishing operation.

Fishing tools are of many types, and usually include some kind of mechanical device at the lower end of the tool string for engaging and holding the lost part or "fish". The operation of these tools is generally uncertain as there is no thoroughly reliable means for grappling with the lost part or "fish" at the bottom of the well.

The general object of this invention is to provide a fishing tool having a receiving chamber, or bowl, to be carried at the lower end of the tool string, and provided with means for creating a suction into the bowl, which will cause the "fish" to be drawn into the bowl.

A further object of this invention is to provide a fishing tool operating on this suction principle, and so constructed that it will enable circulating liquid to be carried down through the fishing tool.

In the operation of the fishing tool constructed in accordance with this invention, an air chamber, or suction chamber, is provided above the bowl of the fishing tool, and in this chamber, a pressure exists, which is lower than that in the bowl when the tool is submerged. Means is provided for closing off communication between this chamber and the bowl. In the present instance this communication is controlled by a valve that is maintained closed while the fishing tool descends to a point in the well at which the fishing operation is to be performed and until desired to be opened by the operator of the tool. The communication is then suddenly opened, in the present instance by suddenly opening the valve, and in this way, the well pressure within the bowl is suddenly released at the upper end of the bowl, thereby causing an inrush of material or circulating liquid at the bottom of the well, which carries the "fish" in with it.

In the preferred construction of the device, the valve is latched in a closed position, and is released through the agency of a spear that is introduced with the circulating fluid, and passes down the tool string.

One of the objects of the invention is to construct the device in such a way that the circulating fluid in the tool string is permitted to discharge itself from the tool string after fishing and while the tool string is being pulled, in this way avoiding a "wet" pulling operation.

Further objects of the invention will appear hereinafter.

The invention consists of novel parts and combinations of parts to be described hereinafter, all of which contribute to produce an efficient suction fishing tool.

A preferred embodiment of the invention is described in the following specification, while the broad scope of the invention is pointed out in the appended claims.

In the drawing—

Before proceeding to a more detailed description of the invention, it should be stated that it operates on the suction principle, that is, the tool is so constructed that a suction chamber or airtight chamber is formed within the tool above the bowl closed off from the tool string by a tube passing through a packing gland and closed off from the bowl by a valve that is closed when the tool is passing down the well. This suction chamber may be, if desired, under a vacuum, but would ordinarily be used under atmospheric pressure, or any pressure considerably lower than the pressure at the bottom of the well. The valve is normally held in a closed position, but at the proper time, it is opened suddenly, thereby causing a rush of material from the well into the bowl. This carries in the "fish" which is retained by suitable means, within the bowl. The operation of the device is facilitated by the use of circulating liquid, usually mud, which insures adequate fluidity of material at the well bottom when the valve is open, to insure that there will be an inrush of mud, or sand and water, that can be relied upon to carry the "fish" into the bowl.

The valve is preferably held in its closed position by a latching device, which is released by the spear that passes down with the circulating fluid, or liquid, and after unlatching the valve, this spear effects the opening of a drain port, enabling the circulating fluid to drain out of the tool string. The spear also has a special construction facilitating the drainage of the circulating liquid past it, on its way to the drain port.

Figure 1:
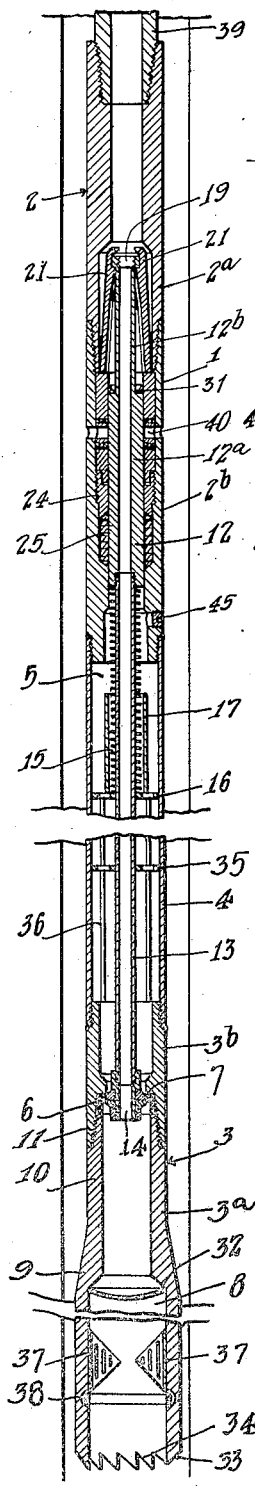
Figure 1 is a vertical section taken through a fishing tool, embodying my invention, and showing a portion of the lower end of the tool string carrying the same; in this view, certain parts are broken away; this figure shows the valve between the suction chamber and the bowl in its closed position.

Referring more particularly to the parts, and especially to Figure 1, 1 indicates the casing of the device, which includes an upper head 2 formed of an upper section 2a, and a lower section 2b. This upper head 2 is connected to a lower head 3 through the medium of a barrel, or cylindrical shell, 4. The lower head includes a bowl 3a and a coupling 3b that constitutes a casing for the valve as will be described hereinafter. The interior of the barrel 4 constitutes an airtight suction chamber 5, the lower end of which is normally closed by a valve 6 that closes by an upward movement upon its seat 7. This valve is air-tight and cuts off communication between the suction chamber 5, and the chamber 8 on the interior of the bowl 9. If desired, the upper end of the bowl may have a reduced neck 10 connected by a screw connection 11 to the valve casing 3b, so as to render the valve accessible. The ends of the barrel 4 may be screw-threaded to the sections 2b and 3b.

Within the upper head 2 of the tool, a tubular plunger 12 is mounted to slide freely, and the lower end of this plunger is provided with a circulation tube 13 that extends downwardly and carries the valve 6, the said valve being provided with a central tubular thimble 14, which permits circulating fluid to pass down through the valve regardless of whether the valve is in its open or closed position.

The spring 15 is a shock absorber or bumper to take up some of the impact of the tripping spear 30 on the tube 12. The lower end of this spring seats upon a spider 16 that is welded in the interior of the barrel 4. Suitable means is provided for stopping the downward movement of the plunger 12, and, for this purpose, I may provide a stop sleeve 17, the lower end of which rests on the spider 16.

Figure 4:
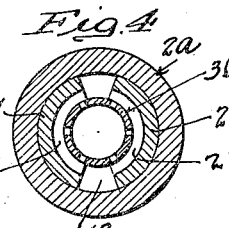
Figure 4 is a horizontal section taken on the line 4—4 of Figure 2.

The plunger 12 includes a plunger head 12a of enlarged diameter, and a tubular stem 12b of reduced diameter. The upper end of this stem 12b cooperates with a suitable latching device 18, which normally holds the valve in its closed position. In order to accomplish this, I prefer to provide the upper end of the stem 12b with an enlarged head 19, which forms an inclined annular shoulder 20. The head 19 at the upper end of the tubular stem 12b is provided with internal threads 46, which enable a threaded tool to be inserted from above to pull the plunger 12 upwardly, so as to re-set the valve in its closed position. The shoulder 20 is engaged by a plurality of latch fingers 21, preferably two in number. These latch fingers are of arcuate form (see Figure 4), and are received in a counter-bore 22 in the upper head section 2a. The lower ends of these latch fingers rest on a sleeve 23 that is fixed in the bore of the section 2b and seats at its lower end on another sleeve 47 which in turn seats at its lower end on the annular spacer 48 which seats on a packing gland 24 that screws down onto packing 25 in a stuffing box 26.

The upper end of each finger 21 is formed with a socket 27 to engage the head 19 of the tubular stem 12b, and above each socket each finger terminates in an inclined or conical face 28 which enables it to cooperate with the conical tip of a head 29 carried at the lower end of a member or spear 30 which is employed to release the latch device.

At the upper end of the plunger head 12a, and at its junction with the tubular stem 12b, a packing washer or cup-leather 31 is provided to insure that the plunger head 12a will be pressure tight and to help prevent the entrance of grit between the close fitting metal parts.

The upper end of the bowl member 8 is provided with a perforated screen or grid 32 which is preferably of concavo-convex form with the convex side disposed downwardly so as to enable it to resist the impact of material and the "fish" when it passes into the bowl chamber 8, and to protect the valve 6. The lower end of the bowl is preferably constructed like a shoe with a beveled end face 33 which is preferably formed with inclined teeth 34 which enables the bowl to cut into the bottom of the well when the tool string is rotated.

As well pressures are sometimes very high, it may be necessary to brace the interior of the barrel 4 by providing additional spiders such as the spider 35 which is similar to the spider 16, and these spiders are all preferably in the form of perforated disks connected together by vertical tie rods 36 to space the spiders and enable them to be easily placed in the barrel 4.

At the lower end of the bowl, suitable means is provided for retaining the "fish", and this means is preferably in the form of a valve of grid type composed of two sections 37 of segmental form. That is, these valve sections are bent to a cylindrical shape so that in their open position they lie flat against the inner face of the bowl (see Figure 1), and offer very little obstruction to the material and "fish" passing up into the bowl. The middle and lower edge of valve section 37 is connected by a narrow hinge joint 38 at the inner face of the bowl. These sections are normally held in a raised position by a stick or rod (not shown) driven between their outer and upper ends. This support is knocked out by the "fish" upon its entrance to the bowl.

In order to insure that the circulation fluid will drain from the interior of the tool string 39, the head section 2b and the inner sleeve 47 are provided with alining openings that form a drain port 40. In the closed position of the valve, this port 40 is closed by the side of the plunger head 12a (see Figure 1), but when the valve is in its open position, the plunger head moves down sufficiently to clear this port. The port 40 is preferably a double port located on a diameter of the casing and adjacent these ports packing rings 41 and 42 may be provided on the upper and lower sides of the annular sleeve 47, these packing rings assisting in keeping the sand from being carried in by the well pressure into the crack between the plunger head 12a and its guide bore in the sleeve 23 and distributed as might occur when the valve is in its closed position (see Figure 1).

The spear 30 may be built up of tubular sections 30a, 30b and 30c, the last of which is longer than the tubular section of the upper head 2, and is provided with perforations 43, which insure that circulating fluid in the tool string can drain down through the spear and out through the drain ports 40. The upper end of the spear is formed into a mandrel section 44, having four longitudinal fins and attached to the upper tubular section 30a of the spear to facilitate removal of the spear by fishing if it is desired to reestablish circulation through the bowl of this fishing tool. The expansion cup 49 expands against the interior wall of the section 2a to better utilize the pressure of the mud circulation pumps to push the valve 6 off its seat.

The upper end of the suction chamber 5 may be provided with a wash out plug 45 mounted in the side wall of the section 2b.

The ends of the barrel 4 may be screw-threaded onto the sections 2b and 3b and then welded, or they may be telescoped without threads, and welded.

By reason of the presence of the cutting teeth 34 at the lower end of the bowl, it is possible for the tool to be used to cut its way through an obstruction in the well. This is not possible with an ordinary fishing tool.

This invention is also a novel method for performing a fishing operation. It will be noted from the above specification that this method consists in maintaining a closed chamber in the drill tube above the bowl; this chamber is held out of communication with the interior of the bowl until the bowl reaches the well bottom. The introduction of the spear effects the opening of the communication between the interior of the bowl and this closed chamber, thereby causing an inrush of the material to carry the "fish" into the bowl. One of the novel features of my method consists in circulating liquid down through the tubing, past the closed chamber and introducing the spear into this fluid. This is advantageous in that it permits the spear to gain great velocity which is used to force open the valve which controls the passage between the interior of the bowl and the closed low pressure chamber.

Figure 2:
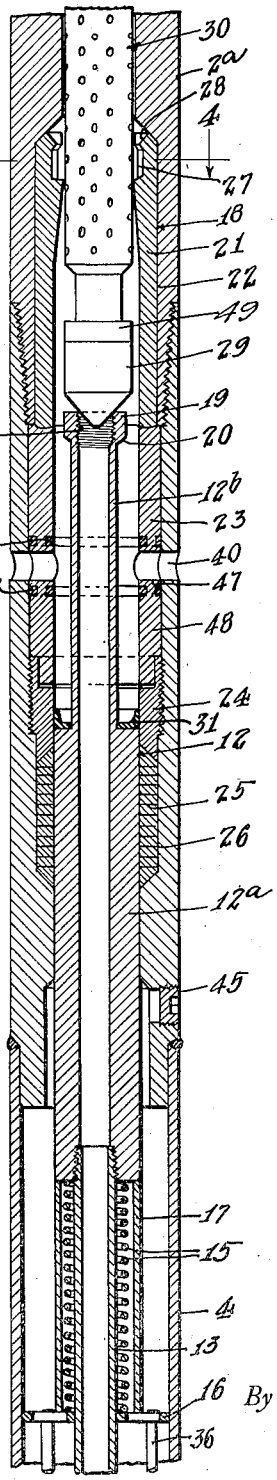
Figure 2 is a view similar to Figure 1, but upon an enlarged scale, and illustrating the upper part of the fishing tool with the lower portion broken away; this view illustrates the lower end of a spear in position after having released the latching device to open the valve; this view also illustrates the means for effecting the draining of the tool string.
Figures 3, 5:
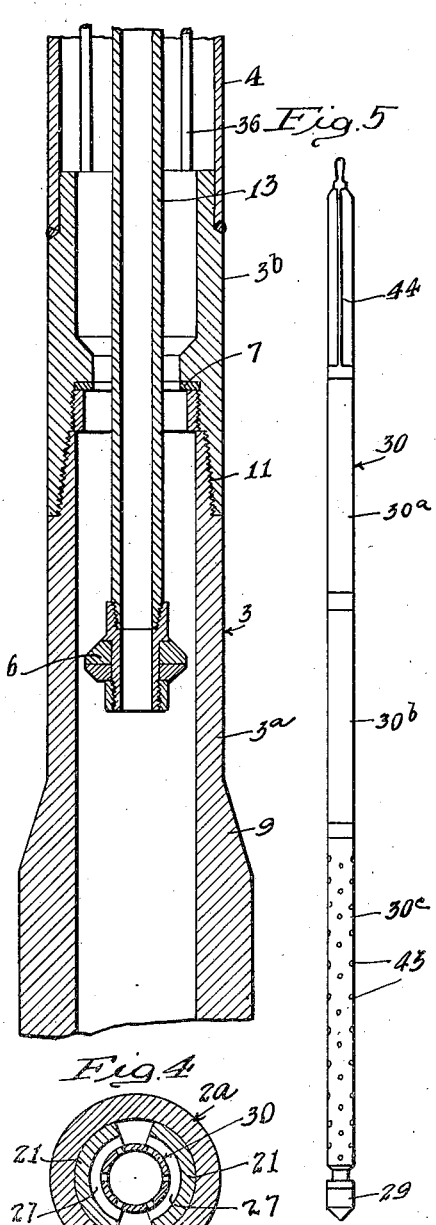
Figure 3 is a vertical section upon the same scale as Figure 2, but illustrating the lower part of the fishing tool, and representing the valve in its open position corresponding to the position of the parts shown in Figure 2; in this view, the lower part of the bowl is broken away.
Figure 5 is a side elevation of a spear, which is employed for releasing the latching device of the valve.

In the operation of the tool, it should be understood that the tool is lowered into the well with the valve closed and the parts in the relation indicated in Figure 1. This maintains the suction chamber 5 closed air-tight at atmospheric pressure, which is, of course, relatively low pressure, and prevents leakage of the well pressure into this chamber while the tool is passing down to the well bottom. After the bowl has arrived at or near the well bottom, the circulating pumps are operated and circulating fluid is forced down the tool string to permit thinning the thick mud in the bottom of the hole. The spear 30, suspended in the circulating head, is then liberated and will be carried down in the tool string. When its head 29 with the conical tip engages the faces 28 of the fingers 21, it will force them outwardly as indicated in Figure 2, thereby releasing the head 19 of the tubular stem 12b.

The spear then continues its downward motion due to its own momentum and the mud pump pressure exerted on its cross section and the cup 49. Its tip engages the head 19, and forces the same downwardly, thereby compressing the bumper spring 15, and holding the valve open. The action is to open the valve suddenly, and when this occurs, the pressure of the circulating fluid, which lies in the well all around the bowl, causes this fluid to rush violently into the bowl. This inrush at the bottom of the well is, of course, in a radial inward direction, and will operate to bring inwardly any lost tool or "fish" lying within the range of this movement. When the material passes into the bowl, it swings the valve sections 37 open (as indicated in Figure 1) to enable the material and "fish" to pass up toward the grating 32. These valve segments are closed by gravity thereafter, so as to retain the "fish". By fishing out the spear, circulation can be re-established down through this fishing tool, if desired.

After catching the "fish", the tool string can be pulled slowly, allowing time for the circulating fluid in the tool string to drain through the drain port 40.

It is understood that the embodiment of the invention described herein is only one of the many embodiments this invention may take, and I do not wish to be limited in the practice of my invention, nor in my claims, to the particular embodiment set forth.

What I claim is:

1. In a fishing tool for operation in a deep well, the combination of a tubular casing to be attached to a tubular tool string, said casing having a closed chamber therein under relatively low pressure, a bowl at the lower end of the casing, a valve for closing off communication between the interior of the bowl and the said chamber, means cooperating with the valve for holding same in a closed position, said last-named means being located in said casing in a position to be struck and released by a spear when guided downwardly through the tool string, to open the valve and thereby enabling the relatively higher pressure in the well to force material from the bottom of the well into the interior of the said bowl to carry in the "fish", and means carried by the bowl for retaining the "fish" within the bowl.

2. In a fishing tool for operation in a deep well, the combination of a tubular casing to be attached to a tubular tool string, said casing having a closed chamber therein under relatively low pressure, a bowl at the lower end of the casing, a valve for closing off communication between the interior of the bowl and the said chamber, said valve having means for enabling circulating liquid to be forced down past the same while the valve is in its closed position, means cooperating with the valve for holding same in a closed position, said last-named means being located in said casing in a position to be struck and released by a spear when guided downwardly through the tool string, to open the valve and thereby enabling the relatively higher pressure in the well to force material from the bottom of the well into the interior of the said bowl to carry in the "fish", and means carried by the bowl for retaining the "fish" within the bowl.

3. In a fishing tool for operation in a deep well, the combination of a tubular casing to be attached to a tubular tool string, said casing having a closed chamber therein under relatively low pressure, a bowl at the lower end of the casing, a valve for closing off communication between the interior of the bowl and the said chamber, said valve having a tubular stem for passing circulating liquid down past the valve while in its closed position, means cooperating with the valve for holding same in a closed position, said last-named means being located in said casing in a position to be struck and released by a spear when guided downwardly through the tool string, to open the valve and thereby enabling the relatively higher pressure in the well to force material from the bottom of the well into the interior of the said bowl to carry in the "fish", and means carried by the bowl for retaining the "fish" within the bowl.

4. In a fishing tool for operation in a deep well, the combination of a tubular casing to be attached to a tubular tool string, said casing having a closed chamber therein under relatively low pressure, a bowl at the lower end of the casing, a valve for closing off communication between the interior of the bowl and the said chamber, said valve having means for enabling circulating liquid to be forced down past the same while the valve is in its closed position, latching means cooperating with the valve for holding the same in its closed position, a member to be inserted in the tool string and carried down with the circulating liquid, said member and said latching means cooperating to release the latching means and open the valve, thereby enabling the relatively high pressure in the well to carry the "fish" into the bowl.

5. In a fishing tool for operation in a deep well, the combination of a tubular casing to be attached to a tubular tool string, said casing having a closed chamber therein under relatively low pressure, a bowl at the lower end of the casing, a valve for closing off communication between the interior of the bowl and the said chamber, a tubular stem carrying said valve and enabling circulating liquid to be forced down past the valve while in its closed position, latching means cooperating with the valve stem for holding the valve in its closed position, a spear to be inserted in the tool string and carried down with the circulating liquid, and cooperating with the latching means to release the latching means and open the valve.

6. In a fishing tool for operation in a deep well, the combination of a tubular casing to be attached to a tubular tool string, said casing having a closed chamber therein under relatively low pressure, a bowl at the lower end of the casing, a valve for closing off communication between the interior of the bowl and the said chamber, a tubular stem carrying said valve and enabling circulating liquid to be forced down past the valve while in its closed position, latching means cooperating with the valve stem for holding the valve in its closed position, a spear to be inserted in the tool string and carried down with the circulating liquid, and cooperating with the latching means to release the latching means and open the valve, said spear operating to force the valve stem downwardly in opening the valve, said casing having a drain port for the circulating liquid and said valve stem having means for holding said drain port closed when the valve is in its closed position.

7. In a fishing tool for operation in a deep well, the combination of a tubular casing to be attached to a tubular tool string, said casing having a closed chamber therein under relatively low pressure, a bowl at the lower end of the casing, a valve for closing off communication between the interior of the bowl and the said chamber, a tubular stem carrying said valve and enabling circulating liquid to be forced down past the valve while in its closed position, latching means cooperating with the valve stem for holding the valve in its closed position, a spear to be inserted in the tool string and carried down with the circulating liquid, and cooperating with the latching means to release the latching means and open the valve, said spear operating to force the valve stem downwardly in opening the valve, said casing having a drain port for the circulating liquid and said valve stem having means for holding said drain port closed when the valve is in its closed position, said spear having means for facilitating draining of circulating liquid from the tool string through the drain port.

8. The method of performing a fishing operation in a deep well which consists in lowering a drill tube carrying a bowl at its lower end, into the well, maintaining a closed chamber in the drill tube above the bowl, holding said chamber out of communication with the interior of the bowl, introducing a member into the drill tubing after the bowl has reached the well bottom, to effect the opening of communication between the interior of the bowl and said chamber, and thereby causing an inrush of material at the bottom of the well to carry the "fish" into the bowl.

9. The method of performing a fishing operation in a deep well which consists in lowering a drill tube carrying a bowl at its lower end, into the well, maintaining a closed chamber in the drill tube above the bowl, holding said chamber out of communication with the interior of the bowl, forcing liquid down the drill tube and past the closed chamber, to the bowl, introducing a member into the said liquid passing down the tubing, after the bowl has reached the well bottom, to effect the opening of communication between the interior of the bowl and said chamber, and thereby causing an inrush of material at the bottom of the well to carry the "fish" into the bowl.

10. In a fishing tool for operation in a deep well, the combination of a casing to be supported within the well, said casing having a closed chamber therein under relatively low pressure, a bowl at the lower end of the casing, a fixed seat, with a valve on said seat for closing off communication between the interior of the bowl and the said chamber, to maintain the said relatively low pressure, said valve being in its closed position until the casing has descended to the level at which the fishing operation is to be conducted, means for suddenly opening the valve, and thereby causing an influx of material from the well into the bowl to carry in the "fish", and means for retaining the "fish" within the bowl.

11. In a fishing tool for operation in a deep well, the combination of a tubular casing to be attached to the lower end of a tubular tool string, said casing having a closed chamber therein under relatively low pressure, a bowl at the lower end of the casing, a valve port below said chamber, a valve cooperating with the port for closing off communication between the interior of the bowl and the said chamber, to maintain the said relatively low pressure, there being a duct for circulating fluid enabling the same to be circulated down past the valve while in its closed position, said valve being in a closed position until the said casing has descended to the level at which the fishing operation is to be performed, means for suddenly opening the valve and thereby causing an influx of material from the well into the bowl to carry in the "fish", and means for retaining the "fish" within the bowl.

12. In a fishing tool for operation in a deep well, the combination of a tubular casing for attachment to the lower end of a tubular tool string, said casing having a closed chamber therein under relatively low pressure, a bowl at the lower end of the casing, a valve port below said chamber, a valve cooperating with the port for closing off communication between the interior of the bowl and the said chamber, to maintain the said relatively low pressure, said valve having a tubular stem extending down through the same to permit passage of circulating liquid past the valve while in its closed position, said valve being in its closed position until the casing has descended to the level at which the fishing operation is to be performed, means for suddenly opening the valve and thereby causing an influx of material from the well into the bowl to carry in the "fish", and means for retaining the "fish" within the bowl.

13. In a fishing tool for operation in a deep well, the combination of a tubular casing to be attached to a tubular tool string, said casing having a closed chamber therein under relatively low pressure, a bowl at the lower end of the casing, a valve port below said chamber, a valve cooperating with the port for closing off communication between the interior of the bowl and the said chamber, to maintain the said relatively low pressure, means for effecting circulation down through the casing and past the valve while the same is in its closed position, means cooperating with the valve for holding the same in a closed position, and means for effecting the sudden opening of the valve to enable the circulating liquid or material in the vicinity of the bowl to be sucked into the bowl to carry in the "fish", and means carried by the bowl for retaining the "fish" within the bowl.

14. In a suction fishing tool, the combination of a tubular casing to be attached to the lower end of a tool string, said casing having an upper chamber with a relatively low internal pressure, a bowl carried at the lower end of said casing and having cutting teeth at its lower end enabling the tool to cut its way into the well bottom when rotated, a fixed seat with a valve on said seat for closing off communication between the interior of said chamber and said bowl, and means for suddenly opening the valve to cause a suction effect at the upper end of the bowl, and induce an inrush of material at the bottom of the well to carry the fish into the bowl.

OMAR A. CAVINS.